United States Patent [19]
Mery et al.

[11] Patent Number: 6,044,935
[45] Date of Patent: Apr. 4, 2000

[54] HYBRID MULTIPLE DISC BRAKE

[75] Inventors: Jean Claude Mery, Pavillons-sous; Jean Pierre Boisseau, Paris; Jacques Laurent, Rosny-Sous-Bois, all of France

[73] Assignee: Bosch Systems de Freinage, Drancy, France

[21] Appl. No.: 09/051,113

[22] PCT Filed: Feb. 12, 1998

[86] PCT No.: PCT/FR98/00267

§ 371 Date: Mar. 30, 1998

§ 102(e) Date: Mar. 30, 1998

[87] PCT Pub. No.: WO98/41778

PCT Pub. Date: Mar. 24, 1998

[30] Foreign Application Priority Data

Mar. 14, 1997 [FR] France .................................. 97 03063

[51] Int. Cl.[7] .................................................. F16D 55/36
[52] U.S. Cl. .................... 188/71.5; 188/72.4; 188/72.5
[58] Field of Search .................. 188/71.5, 72.4, 188/72.5, 367, 368, 369, 370

[56] References Cited

U.S. PATENT DOCUMENTS

| | | | |
|---|---|---|---|
| 4,234,061 | 11/1980 | Margetts et al. | 188/72.4 |
| 4,529,067 | 7/1985 | Scott | 188/71.5 |
| 4,576,255 | 3/1986 | Mery et al. | 188/71.5 |
| 4,598,799 | 7/1986 | Thioux | 188/71.5 |
| 4,605,103 | 8/1986 | Carre et al. | 188/71.5 |
| 4,823,920 | 4/1989 | Evans | 188/72.4 |
| 4,865,160 | 9/1989 | Casey | 188/71.5 |

FOREIGN PATENT DOCUMENTS

| | | | |
|---|---|---|---|
| 2626567 | 4/1985 | Germany | 188/71.5 |
| 0012134 | 1/1982 | Japan | 188/71.5 |
| 0073134 | 4/1985 | Japan | 188/71.5 |

*Primary Examiner*—Christopher P. Schwartz
*Assistant Examiner*—Devon Kramer
*Attorney, Agent, or Firm*—Leo H. McCormick, Jr.; Warren Comstock

[57] ABSTRACT

A braking device having a stator (10) fixed to a vehicle by at least one fixing arm (5), a rotor (6) which comprises a first disc (13) and a second disc (16) and brake applying member (40,50). The first disc (13) and second disc (16) rotate with a wheel of the vehicle are fixed with respect to each other with the first disc (13) being located closer to the fixing arm (5). The braking applying member (40,50) has a fixed caliper (40) which is dedicated to braking the second disc (16) and a sliding caliper (50) which is dedicated to braking the first disc (13) to effecg a brake application.

8 Claims, 4 Drawing Sheets

HYBRID MULTIPLE DISC BRAKE

The present invention relates to a multi-disc braking device for a motor vehicle equipped with at least one wheel rotating about a transverse axis in a direct rotation direction which corresponds to forward travel of the vehicle, this device comprising:

- a stator fixed to the vehicle by means of at least one fixing arm;
- a rotor comprising a first disc and a second disc which rotate with the wheel and are spaced apart and fixed along the transverse axis, the first disc being closer to the fixing arm than the second disc, and the first and second discs having respective internal faces which face each other, and respective external faces;
- a first pair and a second pair of friction pads interacting respectively with the first disc and with the second disc, each pair of pads comprising an internal pad and an external pad pointing respectively towards the internal and external faces of the disc with which this pair of pads interacts;
- brake-application means themselves comprising: at least one first piston sliding in a first cylinder under the action of a first hydraulic pressure to apply the first external pad against the first disc; a fixed caliper secured to the stator and having an upstream end and a downstream end which are spaced apart in a direction tangential to the rotor and follow one after the other in this order in the direct rotation direction, this fixed caliper straddling the second disc and between its two ends carrying a second internal cylinder and a second external cylinder in which there slide respectively, under the action of a second hydraulic pressure, a second internal piston and a second external piston which are respectively capable of applying the second internal pad and second external pad against the second disc;
- and connecting means for securing the two ends of the fixed caliper to the stator.

BACKGROUND OF THE INVENTION

Braking devices of this type are known in the prior art, and illustrated, for example, by Patent Document FR-2,314,399.

In general, brakes with multiple discs are above all known for their application in heavy goods vehicles or in utility vehicles.

Their application in lightweight vehicles or touring vehicles by contrast poses an acute problem of compactness, for which the invention proposes to provide a novel solution.

SUMMARY OF THE INVENTION

To this end, the braking device of the invention, which in other respects is in accordance with the definition given in the preamble above, is essentially characterized in that the brake-application means further comprise: a sliding caliper having an upstream end and a downstream end which are spaced apart in a direction tangential to the rotor and follow one after the other in this order in the direct rotation direction, this sliding caliper carrying the first cylinder between its two ends, straddling the first disc and having a tip arranged between the two discs, the first external pad, the first disc and the first internal pad thus being clamped between the first piston and the tip of the sliding caliper; fixed upstream and downstream guiding means secured to the stator, and moving upstream and downstream guiding means respectively secured to the upstream and downstream ends of the sliding caliper, the moving upstream and downstream guiding means being mounted respectively so that they can slide with respect to the fixed upstream and downstream guiding means in order to allow the sliding caliper to slide with respect to the stator.

The compactness of this device can be further improved by making provision for the tip of the sliding caliper to comprise two parts separated by an empty space and for the second internal cylinder to be arranged in this empty space.

It is furthermore advantageous to produce the rotor in at least two parts, one of which includes the first disc and the other of which includes the second disc, it thus being possible in particular for the two discs to be made of different materials.

To optimize the operation of this device in arduous service conditions, it may also be desirable for the rotor, which is shaped like a hub between the first and second discs, to be pierced with holes for ventilating the internal faces of the discs.

Although the axes of symmetry of the first cylinder and of the second cylinders may be coincident, it may also be preferable for the axis of symmetry of the first cylinder to be further forward, in the direct rotation direction, than the axes of symmetry of the second cylinders.

To limit the maximum deformation experienced by this braking device under stress, the first internal pad and the first external pad may be attached to the stator by their respective upstream ends, that is to say by those of their respective ends which are set back in the direct rotation direction, while these pads rest on the stator via their respective downstream ends.

To reduce the total number of components needed to produce this device, at least one of the connecting means may comprise a screw forming a guide pin, this guide pin constituting at least one of the upstream and downstream guiding means.

Further features and advantages of the invention will become clear from the description thereof given hereafter by way of non-limiting indication with reference to the attached drawings

DETAILED DESCRIPTION OF THE INVENTION

Figure 1:
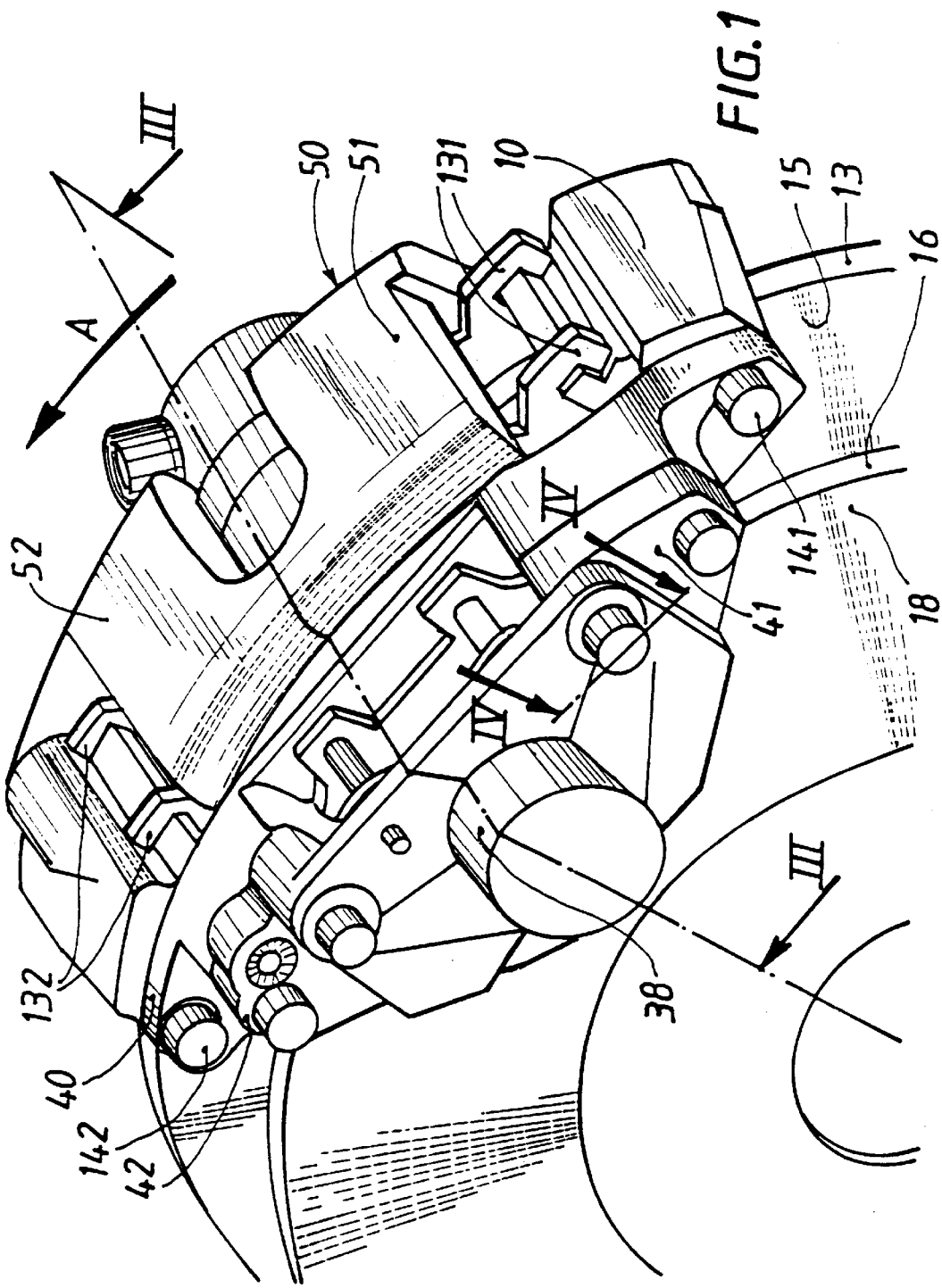
FIG. 1 is a perspective view of the braking device produced according to the teachings of the present invention, viewed from the outboard side of the vehicle, the direction of the arrow A corresponding to the direction of rotation of the wheel, conventionally termed "direct direction" for the vehicle travelling forwards.
Figure 2:
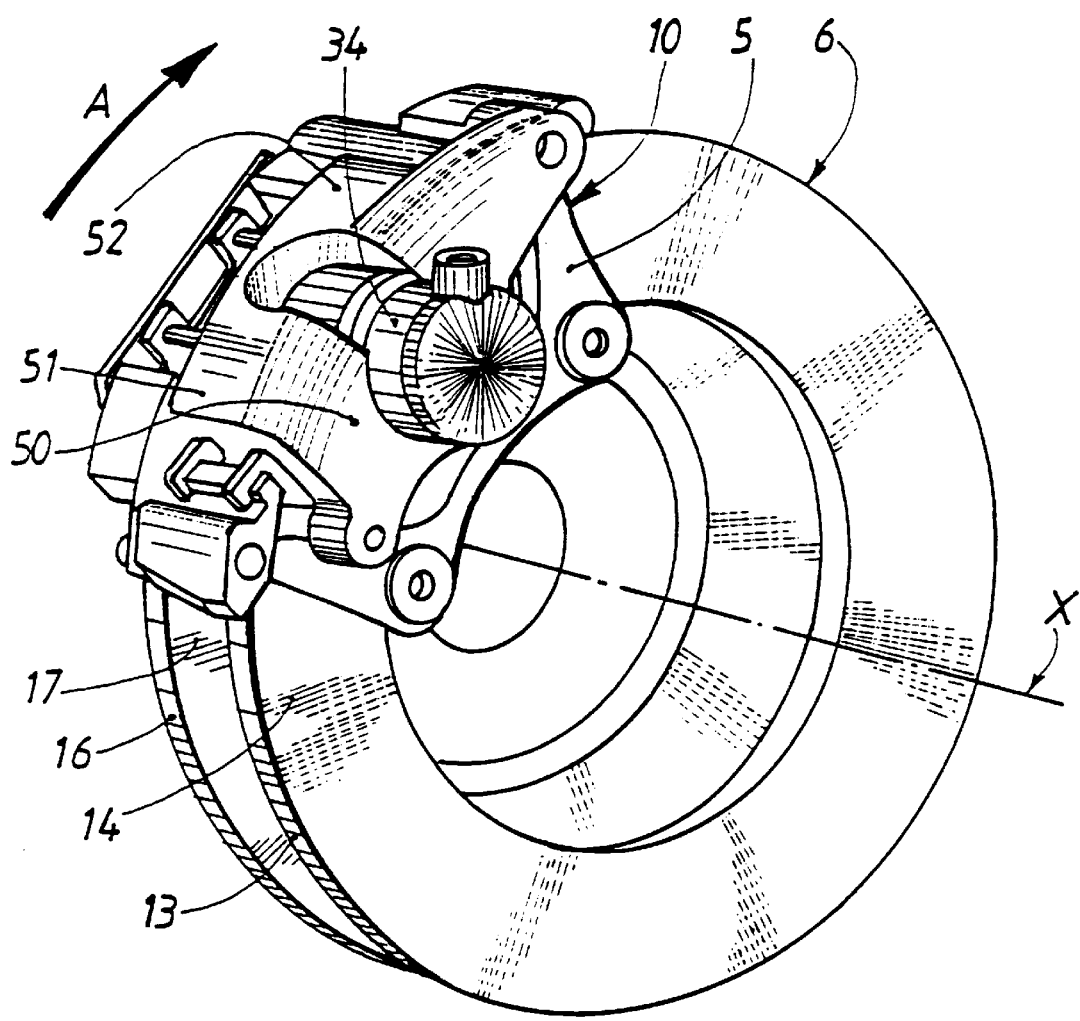
FIG. 2 is a perspective view of the braking device of FIG. 1, viewed from the inboard side of the vehicle.

FIGS. 1 and 2 represent a braking device comprising a stator 10 fixed to the vehicle by a fixing arm 5 which forms an integral part of a fixed part, not represented, of the vehicle, such as a stub axle, or is secured to this fixed part, for example screwed to it.

The fixing arm 5 points towards the external face 14 of a first disc 13 which forms part of a rotor 6 rotating with the wheel of the vehicle.

The rotor 6 comprises a second disc 16, the two discs 13 and 16 being spaced apart and fixed along the transverse axis X of the wheel and having two internal faces 15 and 17 respectively, which face each other, the external face 18 of the second disc 16 therefore pointing towards the outboard side of the vehicle.

Figure 3:
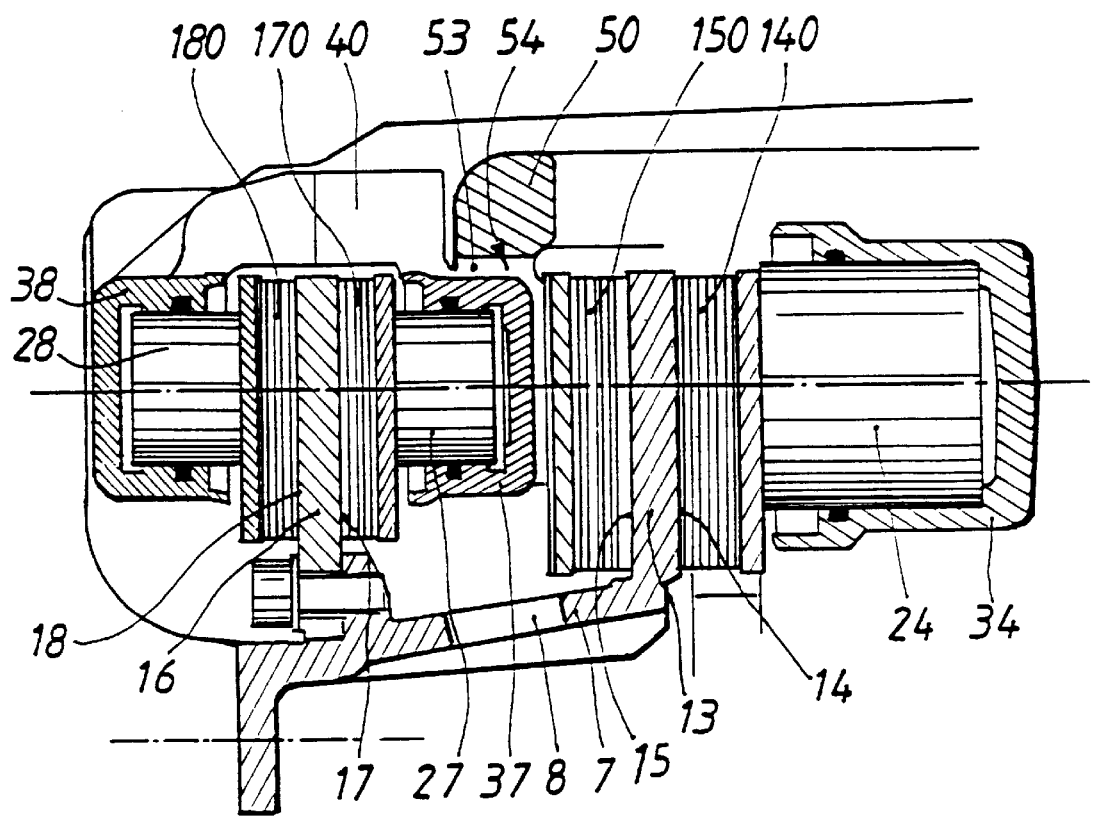
FIG. 3 is a sectional view of the device of the present invention on the line III—III of FIG. 1.

As has been represented in FIG. 3, a first pair 140, 150 and a second pair 170, 180 of friction pads may be brought respectively into contact with the first disc and with the second disc, each pair of pads comprising an internal pad 150 or 170 and an external pad 140 or 180 respectively pointing towards the internal face and the external face of the disc with which it makes contact.

Brake-application means are provided for applying these pads against the discs, these brake-application means comprising a first piston 24 sliding in a first cylinder 34 under the action of a first hydraulic pressure to apply the first external pad 140 against the external face 14 of the first disc 13, and a second internal piston 27 and a second external piston 28 sliding in a second internal cylinder 37 and a second external cylinder 38 under the action of a second hydraulic pressure to apply the second internal pad 170 and the second external pad 180 to the internal face 17 and to the external face 18 of the second disc 16.

The second internal cylinder 37 and second external cylinder 38 are carried by a fixed caliper 40 secured to the stator 10 and straddling the second disc 16.

Figure 4:
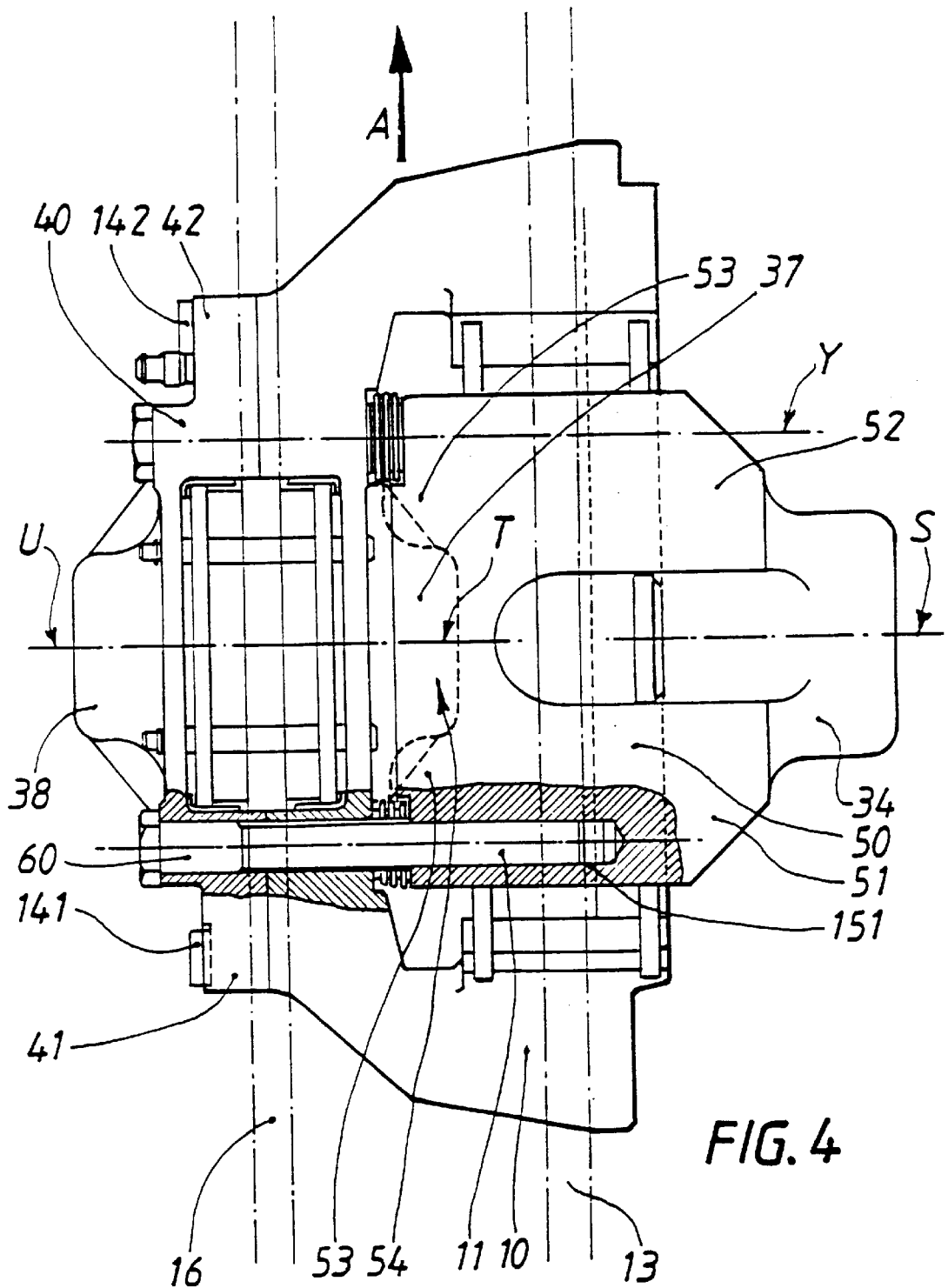
FIG. 4 is a view from above of the device of the invention with a local section on IV—IV of FIG. 1.

As represented in FIGS. 1 and 4, the fixed caliper 40 moreover has an upstream end 41 and a downstream end 42 which are spaced apart in a direction tangential to the rotor 6, and follow one after the other in this order in the direction of rotation of the wheel indicated by the arrow A and corresponding to the vehicle travelling forwards, and which are respectively secured to the stator 10 by connecting means, which for example consist of fixing screws 141 and 142.

In accordance with the present invention, the brake-application means also comprise a sliding caliper 50 straddling the first disc 13 and between its upstream end 51 and downstream end 52 comprising a first cylinder 34, and a tip 53 arranged between the two discs 13 and 16, the upstream end 51 and the downstream end 52 of this sliding caliper being spaced apart in a direction tangential to the rotor 6 and following one after the other in this order in the direction of rotation of the wheel during forward travel.

In this way, the first external pad 140, the first internal pad 150, and the first disc 13 are clamped between the first piston 24 and the tip 53 of the caliper.

In the embodiment represented in the figures, the stator 10 has fixed upstream guiding means 11 consisting, for example, of a cylindrical guide pin, while the upstream end 51 of the sliding caliper 50 have [sic] moving upstream guiding means 151 consisting, for example, of a cylindrical housing receiving the guide pin, the moving means thus being mounted respectively so that they can slide with respect to the fixed means and allowing the sliding caliper 50 to slide with respect to the stator 10.

Those skilled in the art will have no difficulty in understanding that similar means can obviously be adopted as regards the downstream guiding means, for example at the axis Y.

Furthermore, the compactness of this device may be further improved by making provision for the tip 53 of the sliding caliper 50 to comprise two parts separated by an empty space 54 and for the second internal cylinder 37 to be arranged in this empty space (FIG. 4).

It is advantageous for the rotor 6 to be produced in at least two parts, one of which includes the first disc 13, and the other of which includes the second disc 16, as this makes it possible, for example, to use discs made of different materials, it being possible for example for one of the discs to be made of cast iron and the other of carbon.

Furthermore, to optimize the operation of this device in arduous service conditions, it may also be desirable for the rotor 6, which is shaped like a hub 7 between the first and second discs 13 and 16, to be pierced with holes 8 for ventilating the internal faces 15 and 17 of the discs.

In a preferred embodiment, the axes of symmetry of the first cylinder and of the second cylinders 34 37 and 38 may be coincident, but it may also be preferable for the axis of symmetry S of the first cylinder 34 to be further forward, in the direct rotation direction indicated by the arrow A, than the axes of symmetry T and U of the second cylinders 37 and 38.

It is advantageous for the first internal pad 150 and the first external pad 140 to be attached to the stator 10 by their respective upstream ends 131, that is to say by those of their respective ends which are set back in the direction of rotation of the arrow A, while these pads rest on the stator via their respective downstream ends 132, this arrangement thus making it possible to limit the maximum deformation experienced by this braking device under stress.

Finally, it is advantageous to reduce the total number of components needed to produce this device by making provision, as illustrated in FIG. 4, for at least one of the connecting means to comprise a screw 60 forming a guide pin, this guide pin constituting at least one of the upstream 11 and downstream guiding means for the sliding caliper.

A multi-disc braking device which enables good compactness thanks to a device with a fixed caliper 40 being nested inside a device with a sliding caliper 50, and in which the deformation under stress is reduced to a minimum value, has indeed been achieved, the fixed caliper 40 playing a part in making the stator 10, which supports the sliding caliper, rigid.

Of course, the invention is not restricted to the embodiment which has been described but can on the contrary be modified in a number of ways which will be clear to those skilled in the art and which fall within the scope of the attached claims. Thus for example the stator 10 could be produced as one piece with the fixed caliper element which supports the cylinder 37, as described in FIG. 4.

We claim:

1. A multi-disc braking device for a motor vehicle equipped with at least one wheel which rotates about a transverse axis in a direct rotation direction corresponding to travel of a vehicle, said device comprising:

a stator fixed to said vehicle by means of at least one fixing arm; a rotor comprising a first disc and a second disc which rotate with said wheel, said first and second disc being are spaced apart and fixed along said transverse axis, said first disc being closer to the fixing arm than said second disc, said first disc having a first internal face and a first external face, said second disc having a second internal face and a second external face, said first and second internal faces facing each other;

a first pair of friction pads interacting with said first disc and a second pair of friction pads interacting with said second disc, each of said first and second pair of pads comprising an internal pad and an external pad which respectively point towards the internal and external faces of said first and second disc;

brake application means having at least one first piston sliding in a first cylinder under the action of a first hydraulic pressure to apply the first external pad against said first disc; a fixed caliper secured to said stator and having an upstream end and a downstream end which are spaced apart in a direction tangential to said rotor and follow each other during rotation, said fixed caliper straddling said second disc and having a second internal cylinder with a second external cylinder which slide under the action of a second hydraulic pressure to apply said second internal pad and second external pad against said second disc; and connecting means for securing said upstream end and said downstream end of said fixed caliper to said stator; characterized in that said brake-application means further comprise: a sliding caliper having an upstream end and a downstream end which are spaced apart in a direction tangential to said rotor and follow each other during rotation, said sliding caliper carrying said first cylinder between a upstream end and a downstream end while straddling said first disc, said sliding caliper having a tip located between said first and second discs, said first external pad, said first disc and said first internal pad being clamped between said first piston and said tip of said sliding caliper; fixed first upstream and downstream guiding means secured to said stator, and moving second upstream and downstream guiding means respectively secured to said upstream and downstream ends of said sliding caliper, said moving second upstream and downstream guiding means being mounted to respectively slide with respect to said fixed first upstream and downstream guiding means and allow said sliding caliper to slide with respect to said stator.

2. The braking device according to claim 1, characterized in that said tip of said sliding caliper comprises first and second parts separated by empty space with said second internal cylinder being located in said empty space.

3. The braking device according to claim 1, characterized in that said rotor comprises at least a first disc and a second disc.

4. The braking device according to claim 3, characterized in that said rotor is shaped like a hub between the first and second discs, said hub is pierced with holes for ventilating said internal faces of said first and second discs.

5. The braking device according to claim 1 wherein said first and second cylinders have corresponding first and second axis of symmetry with said first axis of symmetry being further forward, in the direct rotation direction, than said second axis of symmetry of the second cylinder.

6. The braking device according to claim 1 wherein said first internal pad and said first external pad each have an upstream end and a downstream end which point respectively towards said upstream end and downstream end of said sliding caliper, said first internal pad and first external pad being respectively attached to said stator by their respective upstream ends.

7. The braking device according to claim 1, characterized in that said first internal pad and said first external pad rest against said stator via their respective downstream ends.

8. The braking device according to claim 1, characterized in that at least one of said connecting means comprises a screw forming a guide pin, and said guide pin constitutes at least one of said upstream and downstream guiding means.

* * * * *